United States Patent
Boyle et al.

(10) Patent No.: US 12,437,299 B2
(45) Date of Patent: Oct. 7, 2025

(54) TRUSTED CUSTOMER IDENTITY SYSTEMS AND METHODS

(71) Applicant: SHAZZLE, LLC, Weymouth, MA (US)

(72) Inventors: Clifford F. Boyle, Scottsdale, AZ (US); Robert E. Mcgill, Rumson, NJ (US)

(73) Assignee: SHAZZLE, LLC, Weymouth, MA (US)

( * ) Notice: Subject to any disclaimer, the term of this patent is extended or adjusted under 35 U.S.C. 154(b) by 614 days.

(21) Appl. No.: 16/858,052

(22) Filed: Apr. 24, 2020

(65) Prior Publication Data

US 2020/0342459 A1 Oct. 29, 2020

Related U.S. Application Data (60) Provisional application No. 62/838,490, filed on Apr. 25, 2019.

(51) Int. Cl.
*G06Q 20/40* (2012.01)
*G06Q 20/16* (2012.01)
(Continued)

(52) U.S. Cl.
CPC ......... *G06Q 20/4014* (2013.01); *G06Q 20/16* (2013.01); *G06Q 20/305* (2013.01);
(Continued)

(58) Field of Classification Search
CPC ............. G06Q 20/4014; G06Q 20/322; G06Q 2220/00; H04L 9/0822; H04L 9/0825;
(Continued)

(56) References Cited

U.S. PATENT DOCUMENTS

| 7,849,020 B2 | 12/2010 | Johnson |
| 8,447,983 B1 * | 5/2013 | Beck ..................... H04L 9/0894 |
| | | 713/172 |

(Continued)

FOREIGN PATENT DOCUMENTS

| CN | 101421754 A | 4/2009 |
| CN | 101427268 A | 5/2009 |

(Continued)

OTHER PUBLICATIONS

Gupta et al. "Combining Keystroke Dynamics and Face Recognition for User Verification", 2015 IEEE 18th International Conference on Computational Science and Engineering, Oct. 23, 2015. Retrieved on Jun. 19, 2020. Retrieved from: <URL:https://ieeexplore. ieee .org/abstract/document/7371386> entire document.

*Primary Examiner* — John W Hayes
*Assistant Examiner* — Edgar R. Martinez-Hernandez
(74) *Attorney, Agent, or Firm* — RAPHAEL BELLUM PLLC (57) ABSTRACT

Trusted customer identity systems and methods provide secure electronic payment transactions incorporating customer identity verification using cross-referenced multiple data sources. Two distinct authorities provide payment speed, simplicity, and security. A network path-based identity methodology does not require shared information between parties. A first party receives a secure token and has sole access and controls possession of unique data that they append to the token. Before a transaction, a unique identifying characteristic of the party is used to register it on the trusted customer network. Other parties on the network do not possess a copy of the unique data but, based on the registration characteristics of the first party, know when they receive the token that only the first party could have added the unique data to the token. Other parties on the network (Continued)

can trust that the first party is the same party who registered this account to the network.

21 Claims, 4 Drawing Sheets (51) Int. Cl.
  *G06Q 20/30* (2012.01)
  *G06Q 20/32* (2012.01)
  *G06Q 20/38* (2012.01)
  *H04L 9/08* (2006.01)
  *H04L 9/32* (2006.01)
  *H04L 9/40* (2022.01)

(52) U.S. Cl.
  CPC ....... *G06Q 20/322* (2013.01); *G06Q 20/3823* (2013.01); *G06Q 20/3829* (2013.01); *H04L 9/0822* (2013.01); *H04L 9/0825* (2013.01); *H04L 9/0891* (2013.01); *H04L 9/3213* (2013.01); *H04L 9/3226* (2013.01); *H04L 63/0428* (2013.01); *H04L 63/0861* (2013.01); *H04L 63/0876* (2013.01); *H04L 63/126* (2013.01); *G06Q 2220/00* (2013.01); *H04L 2209/56* (2013.01)

(58) Field of Classification Search
  CPC . H04L 9/3213; H04L 9/3226; H04L 63/0876; H04L 63/126
  See application file for complete search history.

(56) References Cited

U.S. PATENT DOCUMENTS

| | | | |
|---|---|---|---|
| 8,996,423 | B2 | 3/2015 | Johnson et al. |
| 9,342,832 | B2 * | 5/2016 | Basu .................... G06Q 20/385 |
| 9,760,871 | B1 * | 9/2017 | Pourfallah ........... G06Q 20/405 |
| 9,805,213 | B1 | 10/2017 | Kragh |
| 10,007,904 | B2 | 6/2018 | Eld et al. |
| 10,277,569 | B1 * | 4/2019 | Barbour ................ H04L 9/3228 |
| 10,341,485 | B1 * | 7/2019 | Patel .................... H04L 9/3213 |
| 10,607,212 | B2 | 3/2020 | Sheets et al. |
| 10,878,402 | B1 * | 12/2020 | Blackie ................ G06Q 20/204 |
| 11,227,252 | B1 * | 1/2022 | Zimberoff ............ G06Q 10/083 |
| 11,429,975 | B1 * | 8/2022 | Asefi ................... G06Q 20/3821 |
| 2004/0083215 | A1 | 4/2004 | De Jong |
| 2006/0006226 | A1 * | 1/2006 | Fitzgerald ............. H04W 12/06 235/380 |
| 2006/0235795 | A1 | 10/2006 | Johnson et al. |
| 2007/0160209 | A1 | 7/2007 | Kasahara |
| 2009/0048953 | A1 * | 2/2009 | Hazel ..................... G07G 3/003 705/35 |
| 2009/0119182 | A1 | 5/2009 | Krstulich et al. |
| 2009/0158316 | A1 | 6/2009 | Kokernak |
| 2011/0251892 | A1 * | 10/2011 | Laracey ................. G06Q 20/20 705/16 |
| 2011/0307710 | A1 * | 12/2011 | McGuire .............. G06Q 20/382 726/9 |
| 2012/0297191 | A1 * | 11/2012 | Johnson ................ H04L 63/123 713/168 |
| 2013/0254117 | A1 * | 9/2013 | von Mueller ...... G06Q 20/3829 705/71 |
| 2014/0372308 | A1 * | 12/2014 | Sheets .................... G06Q 20/20 705/44 |
| 2015/0081567 | A1 | 3/2015 | Boyle |
| 2015/0088756 | A1 * | 3/2015 | Makhotin ............ G06Q 20/326 705/71 |
| 2015/0113275 | A1 * | 4/2015 | Kim ...................... H04L 9/0877 713/169 |
| 2015/0134948 | A1 | 5/2015 | Boyle et al. |
| 2015/0294313 | A1 * | 10/2015 | Kamal ................. G06Q 20/322 705/44 |
| 2016/0055322 | A1 * | 2/2016 | Thomas ................. G06F 21/10 726/7 |
| 2016/0191236 | A1 * | 6/2016 | Smirnoff ............... H04L 9/0822 713/171 |
| 2017/0200147 | A1 * | 7/2017 | Ansari ................. G06Q 20/381 |
| 2017/0213210 | A1 * | 7/2017 | Kravitz .............. G06Q 20/3829 |
| 2017/0221054 | A1 * | 8/2017 | Flurscheim ........ G06Q 20/3276 |
| 2017/0236118 | A1 | 8/2017 | Laracey |
| 2018/0103038 | A1 * | 4/2018 | Burke ................. G06F 16/9038 |
| 2018/0137512 | A1 | 5/2018 | Georgiadis |
| 2019/0230070 | A1 * | 7/2019 | Isaacson ............. H04W 12/084 |
| 2019/0279198 | A1 * | 9/2019 | Laracey ............. G06Q 20/3674 |
| 2019/0333059 | A1 * | 10/2019 | Fallah ................. G06F 16/1834 |
| 2020/0004775 | A1 * | 1/2020 | Beutelschiess ........... H04L 9/14 |
| 2020/0136824 | A1 * | 4/2020 | Allen ......................... H04L 9/30 |
| 2020/0329041 | A1 * | 10/2020 | Mandadi ............... H04L 63/061 |
| 2021/0218710 | A1 * | 7/2021 | Fallah ....................... H04L 9/14 |
| 2021/0319436 | A1 * | 10/2021 | Ow ..................... G06Q 20/0658 |
| 2022/0020016 | A1 * | 1/2022 | Scott ....................... G06Q 20/40 |

FOREIGN PATENT DOCUMENTS

| | | | | |
|---|---|---|---|---|
| CN | 101496059 | A | | 7/2009 |
| CN | 113297563 | A * | 8/2021 | ......... G06F 15/7807 |
| ES | 2907854 | T3 * | 4/2022 | ............ H04L 51/34 |
| JP | 2016-510468 | A | | 4/2016 |
| JP | 2013-539567 | A | | 6/2018 |
| JP | 2018-185852 | A | | 11/2018 |
| WO | 2014/130222 | A1 | | 8/2014 |
| WO | WO-2017127564 | A1 * | 7/2017 | ........... G06Q 20/065 |

* cited by examiner

TRUSTED CUSTOMER IDENTITY SYSTEMS AND METHODS

CROSS-REFERENCE TO RELATED APPLICATIONS

This application claims benefit of priority of U.S. Provisional Patent Application No. 62/838,490, filed on Apr. 25, 2019. This application incorporates by reference the entire contents of the provisional application.

TECHNICAL FIELD

This technology relates generally to secure electronic payment transactions and more specifically to secure electronic payments that incorporate a customer identity verification using cross-referenced multiple data sources.

BACKGROUND

Electronic payments are financial transactions made without the use of paper documents, such as checks, or hard currency. Electronic payments include debit card, credit card, smart card, e-wallet, e-cash, electronic checks, and other electronic payment devices. Electronic payment systems have received different acceptance levels throughout the world—some methods of electronic payments are highly adopted and well-received while others have not gained wide acceptance.

Identity theft is a hazard of electronic payments, Internet communications, and other electronic transactions. Payment fraud has become an increasing burden as electronic payment systems have taken over the vast majority of payments from cash. Commerce is moving from paper exchanges in brick-and-mortar stores to electronic transactions on the Internet. Fraud on electronic payments made in brick-and-mortar stores was greatly reduced by introducing the EMV chips on credit cards. The EMV chip establishes that the chip was at the physical location of the retailer at the time of sale by providing a unique code that is created for each credit card transaction. A transaction cannot be approved without the card present.

Internet sales cannot take advantage of EMV chip technology because the spender is very rarely physically present at the retailer where the sale is being processed and so cannot present a physical object to the seller, such as a credit card with an EMV chip.

Prior systems have attempted many different methods of securing Internet communications and access. Passwords are perhaps the most well-known. Another well-known security paradigm is double key encryption.

One technique used previously to attempt to provide secure transactions includes use of a protocol to generate a certificate, which has been stored on a mobile device. Possession of the authorized certificate certifies the device, allowing access to a network of services. There are three parties including a mobile device, an account authority, and a network of services (linked to account authority). These entities trust the account authority. In this scenario, the mobile device generates a key pair and sends a public key to the account authority, which acts similarly to a registry. It also sends a hardware ID. The account authority encrypts the key and ID, signs it, and generates a certificate from the signed, encrypted hardware ID. The account authority then sends the certificate back to the mobile device, where it is stored. For successive uses and mobile requests for access of the network of services, the network of services redirects the request to the account authority. The account authority asks the mobile device for the certificate, and the mobile device submits that certificate with the hardware (device) ID to the account authority for verification (that is, it functions as a gateway). The account authority generates and sends a security token to the mobile device, and the mobile device sends the token to the network of services (with no decryption). The process resembles a single use token.

Similar systems add the use of key pair signatures to provide the identification of a device but do not fully address the shortcomings of prior systems. The key pair signature systems send a challenge, and the device sends a challenge response signed by a key pair function. This challenge requires an active response. The difference with this technique from other account authority systems is that this challenge is less specific, rather than a "give me the certificate" as above. However, these types of systems cannot approve a request (transaction). They can only approve access to their network of services. Their query is along the lines of "We have a service, are you a member?" The systems confirm ID to give access to a service—similar to a log-on transaction. While adding the use of double key encryption, proven by the ability to respond to a challenge, these systems fail to provide the necessary security, non-repudiation, and access to a transaction Other prior systems, including owner-based device authentication and authorization for network access systems grant network access based on other architectures and techniques. For example, these systems cannot approve an individual communication or transaction. Some of these systems combine a device key (stored on a type of authentication server upon registry) with a user credential (ID). Users request network access, and if the device key and user ID match, the requesting user is granted access. In these cases, network access is owner based, rather than device based. That is, the systems store a device ID for each computer device of owner. They also store a user ID of each owner. An authentication server keeps a record of each owner and public keys of devices registered to that owner. A device makes a network request. A network operator may mediate the request, and a device receives a challenge (it must prove private key). The owner then receives the challenge (must prove owner private key). Authentication tracks the device to the owner. If there is a match, access is granted.

Additional methods of restricting access to a payment network to a specific hardware device have been attempted. Entities that move money over the Internet use these types of methods, including the SWIFT (Society for Worldwide Interbank Financial Telecommunication) messaging network and the ACH (Automated Clearing House) network that coordinates electronic payments and automated money transfers. The SWIFT network, as an example, provides users with a piece of hardware (secure element) that is specific to their network and cannot be used for any other purpose. It uses double key encryption of a SWIFT member's assigned code and an RMA (relationship management application) to sign messages that come in unsigned. The signed messages may then be read by gatekeepers to the network to verify the hardware user's identity and allow access to the network. This hardware device method opens a network pathway and then batches all subsequent communications on that pathway. The SWIFT network uses a centralized store-and-forward mechanism, and the SWIFT messages actually change as they flow through the hardware as an encryption key is added.

Out-of-band authentication, the method used by the ACH system, is similar to two-party authentication described above. It is a two-factor authentication that requires a secondary verification method through a separate communication channel along with the typical ID and password. To wit, the ACH system sends a message with a code from the system to a user's pre-verified contact location such as a phone number or email address. The user reads the code and then must type or paste it into the field in the system's communication path set up to receive the code. The system can then check the code against the one sent out to verify that the user has access to the pre-authorized phone number, email address, or the like.

Another example is the Apple Pay mobile payment and digital wallet service, which provides a user a Device Account Number (DAN), which is stored in a secure element on an iPhone. This requires the phone to function much like the secure element that the SWIFT network uses. Apple's DAN is accessible only for transactions that actually take place on the hardware (e.g., an iPhone) that houses the DAN. A communication (or transaction) path that begins outside of the DAN device cannot access the DAN device of a user requiring verification and cannot take advantage of the DAN for verification purposes. In addition, the DAN is specific to a bank or card issuer that moves money on behalf of the DAN device's user. The bank or payment entity actually creates and encrypts the DAN and sends it to the DAN device, where it is stored. There may be many DANs stored on a single device. The DAN is essentially an encrypted password that is stored in a secure element. Also, the DAN encryption method is symmetric. The party that generates and encrypts the DAN knows the password, and the receiving party also knows the DAN password. The password is thus stored in two different places, which poses additional security risks.

As outlined above, a chip card at a credit card reader identifies the chip as being physically present at that seller's card reader at that moment. This form of payment is not conducted through the Internet, and the payment does not flow through the card chip. Limiting access to a payment network in this way has security benefits but has significant limitations when computing devices are compact, mobile, and ubiquitous.

Attempts to provides a seamless, friction-free Internet-based customer transaction experience that integrates high security and convenience with existing payment ecosystems have failed to achieve complete success.

SUMMARY

The trusted customer payment systems and methods of the invention provide payment speed, simplicity, and security. The computer architecture of the invention provides extremely fast authorizations that do not compromise fraud detection and approval processes. The trusted customer invention flawlessly integrates with existing websites and provides end-to-end ease-of-use for both the customer and merchant.

The trusted customer payment systems and methods of the invention extend double-key encryptions techniques and allow for the use of passwords, and go beyond prior systems by providing improved computer architecture and techniques to vet communications and transactions to ensure security, while minimizing user interventions to avoid friction.

The trusted customer systems and methods of the invention verify and route a secure digital file, or "token" over a communications network. A pre-registered receiving party receives a secure token to which it has sole access and can control possession of unique data that they can add or append to the token. Prior to a transaction, a unique identifying characteristic of the receiving party is used to register the receiving party as a member of the network. The other parties on the network do not possess a copy of the unique data but, based on the registration characteristics of the receiving party, they will know when they receive the token that only the receiving party could have added the unique data to the digital token. The other parties on the network can trust that the receiving party is the same party who registered this account to the network.

The systems and methods of the invention employ two distinct authorities on the trusted customer network, namely a verification authority server and a registry server. This architecture provides a more scalable system than prior systems while at the same time providing an increased measure of security over prior systems. Hacking a trusted customer network system in accordance with the invention would require cooperation between two authorities. Further, the invention tests a transaction or communication for approval along a network path. The invention approves or disapproves each (single) communication, rather than simply granting access to a suite of network services and then getting out of the way as in prior systems. These methods of the invention are efficient, because a user does not have to further interact with a network after being granted access. In the systems and methods of the invention, approval is granted to the communication so that they systems can complete the communication actions with no further action or interaction by the user. The systems and methods of the invention provide non-repudiation capabilities in addition to authentication (which grants access to services) by tying an action back to the user who has been identified in the trusted customer process.

The trusted customer systems in accordance with the invention are not restricted to specific pieces of hardware built for the specific purpose of providing network access, like the DAN used in the Apple systems presently known and described above. Instead, most Internet-enabled devices can be used to facilitate network access. New trusted customers' computers can conduct a registration process that requires no special hardware configuration or coding. The trusted customer systems of the invention verify not only access to a network, but they provide the additional step of verifying and approving (which provides non-repudiation) each individual communication through that network.

The trusted customer systems address the shortcomings of prior systems and provide benefits over previous systems through a verified node on the communications network. The verified node is a computer that has been registered by its user, who verifies singular access to the computer. Registration of the computer on the communications network is a condition of approval of an Internet-based transaction. In this way, the receiving party computer (buyer/payer) acts as a "key" in unlocking the communications network and transaction path between buyer and seller. When unlocked by the receiving computer, the communications network consequently has proof (e.g., a modified token) that that particular receiving party computing device was used in the transaction, which acts as a receipt. The trusted customer methods eliminate identity theft as a method of committing payment fraud, because even with a user's identity, passwords, and account information, an electronic transaction using the trusted customer systems of the invention still will not be approved unless the transaction passes through the particular computer associated with a verified user. The systems and methods of the invention also thwart "friendly fraud," where a user may make a transaction and then later report it was fraud, because there is proof that the transaction path passed through the computer of a user that required verification. This identity verification can also be used in other communications and messages, in cases where verifying identity is important. For example, this can be valuable in many areas, including in eliminating phishing attacks, verifying personal identity for HIPAA compliance, and even as a method of reducing spam mail by requiring a sender to be a known entity, trusted by the network.

Trusted customer systems and methods in accordance with the invention use a token-based identity verification system that overcomes the limitations of previous computer systems by using a number of technical means, including asymmetric key pairs, unique hardware IDs, hardware-embedded passwords, and other system components. These components are stored on a device that a user has exclusive physical possession of, as a proxy to verify the identity of that user. The token must traverse a unique network path of the communications network to certify that a user is who they say they are. As the token traverses a predefined network path it picks up information documenting the identity verification process, and verifies the user based on the user's unique physical access to the network node used by the user being verified; and the user's unique technical ability to read and manipulate the token passing through his network node.

The network path-based identification schemes of the invention are fundamentally different from current knowledge-based identity-verification schemes such as passwords, mother's maiden name, etc. in that the systems of the invention do not require a shared piece of information between two parties. Likewise, the systems of the invention are different from current multi factor authentication architectures and schemes such as texting one-time codes, in that they do not require a piece of one-time shared information between two parties. Also, the trusted customer systems and methods of the invention use a separate token for each transaction, such that each token includes a unique identifier (e.g., transaction ID) that establishes approval of the transaction.

In contrast to prior account authority systems and systems for remotely verifying legality of mobile devices based on public and private keys, the systems and methods of the invention include multiple authorities, including a registry server and a verification authority server, which provides a more scalable system, as different verification authority servers can be used for different transactions all the while providing a system more resistant to fraud, because illegal use of the network requires compromising more than a single entity.

Further, the trusted customer systems in accordance with the invention authorize single communication or transaction in a comprehensive process, where a transaction can be completed in a single user-interacting step. Prior account authority systems require a two-step process because they are a gateway, and only provide access to a network of services. Those account authority systems do not act upon or approve the services themselves.

While both the account authority system and the claimed invention prompt the user for verification (in account authority parlance, a "challenge"), the devices and techniques used vary significantly. In the claimed invention, the user device (receiving computer) adds data to the prompt for verification (token) as part of the communication process. The trusted customer network invention adds transaction-specific data that will be visible to the initiating party (called Network of Services in their method). In the account authority system, there is no decryption or re-encryption of a token, but instead, the token is simply passed along. In the present invention, the token is passed to the user device (receiving computer), decrypted with the private key (proving the trusted customer network possesses the private key and so must be a network member), and sent to the initiating computer, who then decrypts the token. These systems are vulnerable to someone copying the private key. In the trusted customer systems and methods, the invention uses a key, plus an approval window, and can add UDID. The account authority systems are single factor authentication, while the trusted customer systems allow multi factor authentication based on the computer architecture and methods.

Account authority systems do not disclose or suggest verification of each token ("challenge"), while the trusted customer invention confirms that each token is not fraudulent by checking it at the verification authority. Account authority systems cannot approve a request, other than to provide access to the network of services. Account authority systems do not include any actionable information and provide only access based on meeting a challenge. The structures and techniques of the trusted customer invention provide non-repudiation and approve each transaction/communication. The trusted customer invention grants approval based on a network member's ability to modify a token ("challenge") based upon rules established by the network.

Similarly, the systems and methods of the trusted customer invention use a token, and users add information to the token. Other account authority systems use a challenge, but the systems and methods of the invention confirm an identity within the context of a unique communication or transaction. The "challenge" in the invention is decrypting the token, re-encrypting it, and sending it forward. The challenge of the token of the invention relates to the configuration of the network. A challenge is successful using the token in this network by getting it from the verification authority server, decrypting it, updating it, re-encrypting it, then sending to the initiating party. The challenge in many account authority systems is decrypting an encrypted piece of text and returning it with a signature. These systems do not re-encrypt the token. They do not update anything or add anything to the token, which is why they don't need to re-encrypt it. In contrast, the systems and methods of the invention are answering a challenge, but those systems and methods have to also accept the challenge within a pre-set network and have to respond in a communication sequence established by the network.

As outlined above, the account authority systems have a single authority, which concentrates approvals in a single party. The trusted customer invention includes systems and methods with two authority parties necessary to conduct each transaction (e.g., a registry server and a verification authority server). This architecture provides a more scalable system while also providing important security features. To compromise the trusted customer systems, a ne'er-do-well would have to hack and compromise both the registry server and the verification server. There would need to be collusion between two different actors. Bifurcating the authority for the transaction is a structural difference that provides concrete computer system performance benefits.

As outlined above, other prior systems, including owner-based device authentication and authorization for network access, grant network access based on other architectures and techniques. For example, these systems cannot approve an individual communication or transaction. The trusted customer system approves each communication/transaction based on physical possession of the device in contrast to owner-based access of prior systems. Some of these prior systems combine a device key with a user credential (ID) for each computer device of the owner. If the device key and user ID match, the requesting user is granted access. This is an owner-based grant of access. The trusted customer invention relies on physical possession of the device, which can be proved by appending or modifying the token.

An additional identification layer may be added to the systems of the invention by having the "receiving party" disclose unique identifying characteristics of its computer hardware, such as a unique device identifier (UDID) on a smart phone, when registering on the network. The UDID is a unique identifier for a single device that is fetched from the smart phone provider's server when a user tries to activate the device. The receiving party can then share its unique identifying characteristic to the network through a software application, and the network verifies the physical hardware used by the "receiving party" in the communication/transaction. The trusted customer systems and methods of the invention do not rely on fixed identifying characteristics such as IP address, password, host name, encryption, secure element, or network attachment status. There are no confidential passwords or personal account information that needs to traverse the communications network (payment) path. Instead, the trusted customer systems of the invention verify singular access of a computing device of a user requiring verification. This is a fundamental difference between the trusted customer identity systems and methods of the invention and other systems. Access to the trusted customer systems paths is not limited to a single piece of hardware or hardware characteristic, because it is not a secure element-based security scheme. The trusted customer systems of the invention are device independent. Any Internet-enabled device that can run a trusted customer software application and can present a configuration that demonstrates it is accessible to a singular user (entity), is eligible. Nor do the trusted customer systems rely on a fixed transaction path like many Internet payment systems. Therefore, they are very adaptable to consumer payments where mobile consumers often change IP addresses and network address translation (NAT), even during a single session. The trusted customer systems rely on a software application running on a specific hardware device for security. The app and hardware device operate automatically (once set up), so there is no need for the consumer to navigate or key anything in for verification and access, although the trusted customer systems can use additional verification layers if desired.

Some banking applications require users to register their phone number with a bank, which allows the bank to send an SMS text to the user with a code they must receive via SMS and then enter into their banking application to give the user access. While this is a security method and may work through a phone, all similarity with the trusted customer systems of the invention ends there. This SMS texting method does not provide identity-through-access to a computer node of a user requiring verification but only provides access to a text through a phone number. Phone numbers can be stolen and spoofed, whereas access to a node of a computer of a user requiring verification cannot be spoofed in any identifiable way. Also, with this SMS method, users have to key in the code they receive, whereas with the trusted customer systems of the invention, users can be passive as no key codes need to be entered. Verification is done automatically by the message passing through the application running on the computing device of the user requiring verification.

Although some of the steps performed by the trusted customer systems (such as pre-verification and asymmetrical key encryption) bear resemblance to past security techniques, the communication paths and steps of the trusted customer systems are different because they use a single communications path to route both the transaction and the authentication and force the communication path through a pre-verified user-requiring-verification's computing device. In this way, the trusted customer systems allow a user to receive messages at a pre-verified contact location (such as an SMS to their phone number) but also ensure that the user has access to a pre-verified computer that the communication must pass through. Given that there is a single communications path, the user need not paste or type any code, nor take any action at all to ensure verification. The fact that the communication passed through the application running on the computing device of the user-requiring verification establishes that user was "present" for the transaction.

One example embodiment of the invention includes an identity verification method for establishing a trusted customer network of users. The method includes downloading an identity verification software application on a receiving computer; creating an asymmetric cryptographic key pair, including a public key and a private key; storing the private key on the receiving computer; sending account information, receiving computer identifying information, and the public key from the receiving computer to a registry server over a communications network; sending an electronic request from the receiving computer to an initiating computer to vet the receiving computer for inclusion in the trusted customer network of users; and receiving an encrypted registered secure token from a verification authority server at the receiving computer.

In one example embodiment of the invention the encrypted registered secure token is created by opening the electronic request from the receiving computer at the initiating computer; double key encrypting the electronic request; sending the double key encrypted electronic request from the initiating computer to the registry server; decrypting the double key encrypted electronic request received by the registry server; checking a member registry to confirm that the receiving computer and the initiating computer are members of the trusted customer network of users; and upon confirmation, encrypting and forwarding the electronic request to a verification server; decrypting the encrypted electronic request received by the verification server; creating a secure token; registering the secure token in a token registry database; and encrypting the registered secure token.

In one example embodiment of the invention, the method also includes decrypting the encrypted registered secure token received from the verification server using the receiving computer; updating the registered secure token with approval information acknowledging that the receiving computer wishes to proceed with an exchange; encrypting the updated registered secure token; and forwarding the encrypted updated token to the initiating computer for verification by the verification server.

In one example embodiment of the invention, the verification includes decrypting the encrypted updated secure token; reading the decrypted secure token to confirm identity verification information of the receiving computer; encrypting the read secure token; forwarding the encrypted read secure token to the verification authority server; decrypting the forwarded encrypted read secure token through the verification authority server; and checking token ID information against the token registry.

In one example embodiment of the invention, when the token ID information matches the token registry, the system retires the token and sends an encrypted message to the initiating computer indicating token acceptance. When the token ID information does not match the token registry, the system retires the token, and sends an encrypted message to the initiating computer indicating token rejection.

DETAILED DESCRIPTION

The trusted customer systems and methods of the invention provide identity verification that routes a secure digital token over a communications network. A pre-registered receiving party has sole access to the token and can control physical possession of unique data that they can add or append to the token. "Physical possession" is sole access to the computing device. For example, a smart phone with a password, retinal scan, or other unique security access provides access to a single person. Other parties on the network do not possess a copy of the unique data but know that only the (receiving) party being vetted could have added it to the token and are able to verify the identity of the receiving party.

Figure 1:
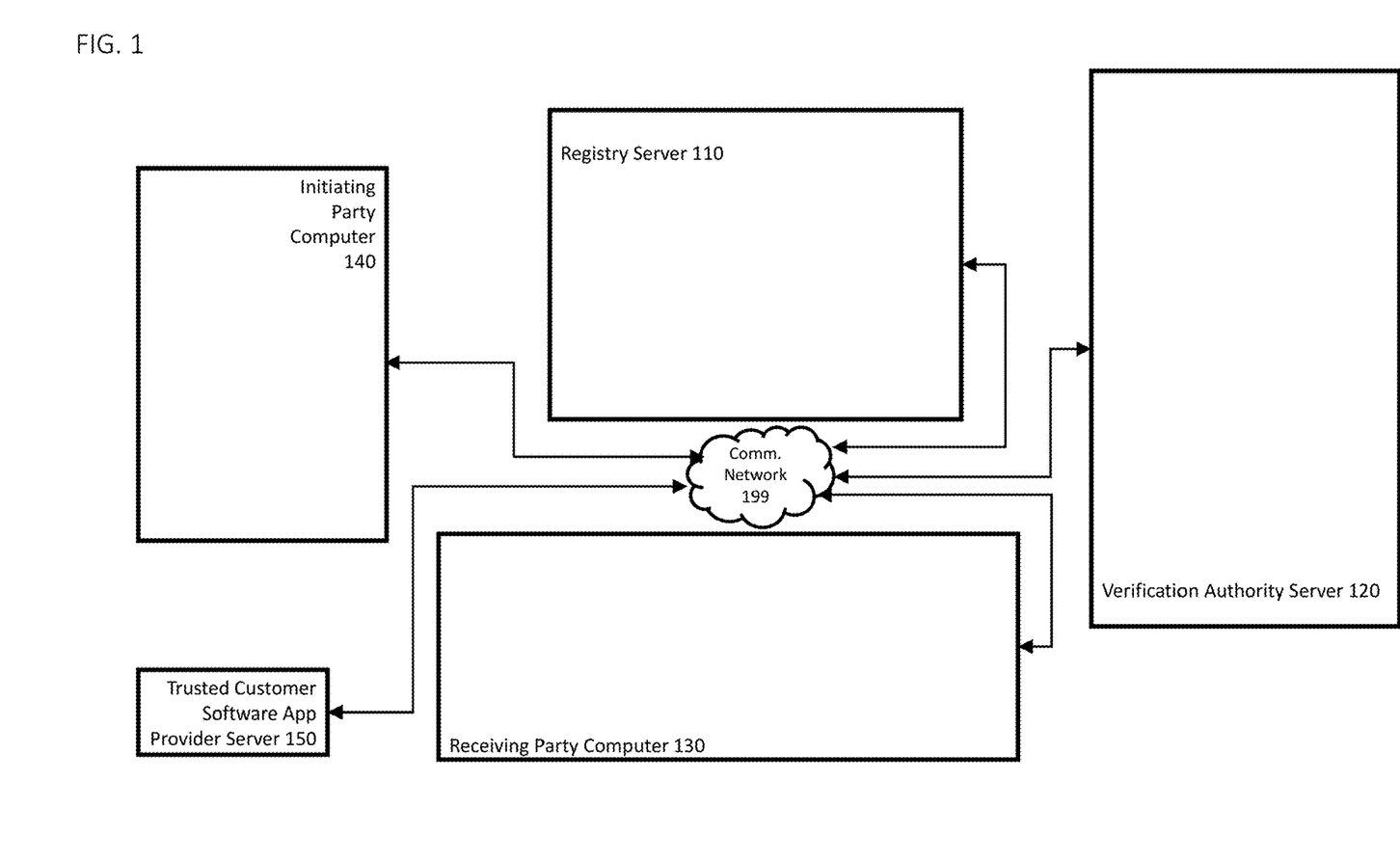
FIG. 1 is an example trusted customer computer system for conducting an electronic transaction in accordance with the invention.

FIG. 1 shows an example trusted customer computer system in accordance with the invention. In this example embodiment, the system 100 includes an initiating party 140, a receiving party 130, a registry server 110, and a verification authority server 120. A trusted customer software application provider server 150 is a delivery source of a trusted customer software app and can include an app store, or other digital distribution platform that allows users to browse and download software applications. The computers and servers 110, 120, 130, 140, 150 communicate with each other (and with other parties outside the network) over a communications network 199, such as the Internet, Wi-Fi, a local area network, for example. Peer-to-peer (p2p) networks can be used. For clarity and brevity, in the process flow diagrams in FIGS. 2 and 3, the communication network 199 is not explicitly shown between the computers and servers 110, 120, 130, 140, 150.

In one embodiment of the invention, the receiving party computing device 130 is the device that a to-be-vetted user (i.e., a receiving party) uses in a communication. In the description below, the identities of the parties are instantiated in the computing devices used by the parties. That is, the receiving party uses a receiving party computer 130, and the initiating party uses an initiating computer 140. The computers/computer devices can be desktop computers, notebook computers, laptop computers, tablets, personal digital assistants, smartphones, workstations, servers, and other computing devices. For brevity and simplicity, in this description, the term "computer" is used to denote any of these devices and is used in conjunction with the party names associated with those computing devices. The parties to the transaction are authenticated to the other parties on the trusted customer communications network, including an initiating party computer 140, a registry server 110 that keeps track of the trusted customer communications network membership, a verification authority server 120 that issues and verifies secure digital tokens, and a receiving party computer 130 that is conducting the to-be-vetted communication with the initiating party computer 140.

Figure 2:
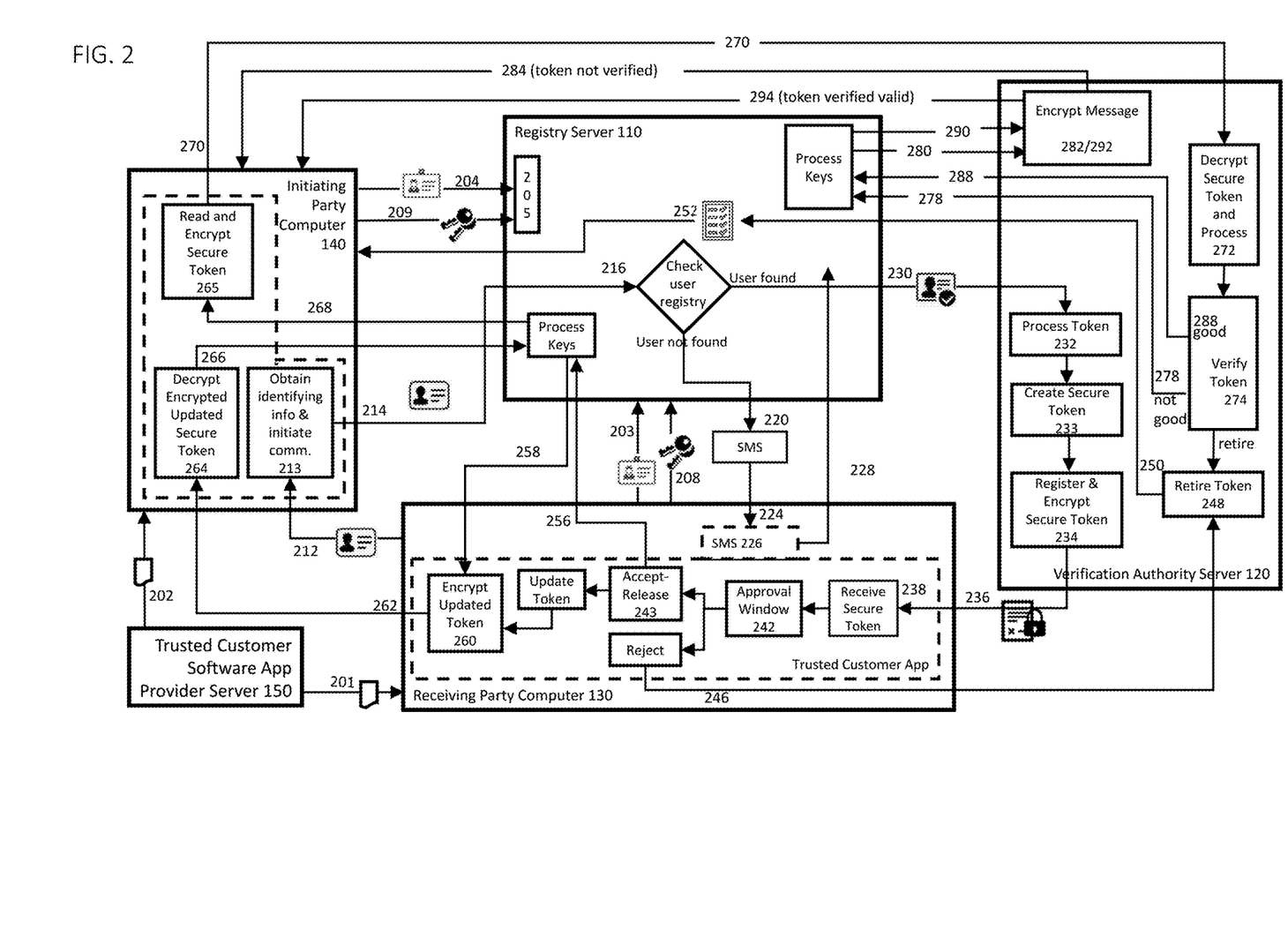
FIG. 2 shows an example system and method conducting an electronic transaction in accordance with the invention.

In one example embodiment of the invention shown in FIGS. 1 and 2, a receiving party joins a trusted customer computer network in block 201 by downloading a trusted customer software application onto receiving (party) computer 130, and registering with registry server 110 by sending an authentication message in block 203. Receiving computer 130 may create and include a password, a user ID, a hardware ID, and other unique identifying information that can be used to establish the receiving party's identity (e.g., mother's maiden name, make of first car, etc.). The receiving party may log physical characteristics of hardware of receiving computer 130 to the trusted customer network to be used in later communications as identifying information. If the initiating party has not installed the trusted customer software application, initiating computer 140 also downloads the app and sends an authentication message to the registry server 110 in blocks 202 and 204, respectively. In block 205, the registry server checks the registry files and registers the parties if they are not already in the registry. In blocks 208 and 209, receiving computer 130 and initiating computer 140 create an encryption key pair and send the public key to the registry server 110. The creation of the key pair is done by the initiating party and receiving party who then share the public key with the registry server. The registry server 110 stores the public keys corresponding to each of the private keys.

Once a member of the trusted customer network, receiving computer 130 initiates a communication through the application running on his computer, and in block 212 sends along unique identifying information (e.g., name, transaction ID, phone number, account or membership ID, and other identifying information) to a trusted customer application running on initiating party computer 140. Initiating computer 140 obtains identifying information from receiving computer 130 in block 213. The unique identifying information can be sent from the receiving computer 130 to initiating computer 140 prior to the transaction as well.

Once the initiating computer 140 receives the request, initiating computer 140 encrypts the request to provide further security when sending the request. In block 214, initiating computer 140 sends the (encrypted) unique information (e.g., name, transaction ID, phone number, etc.) it received from the receiving computer 130 to the registry server 110. This block is the initiating computer 140 vetting receiving computer 130 to make sure receiving computer 130 is a member of the trusted customer network.

Registry server 110 decrypts the double key encrypted electronic request received from the initiating computer 140 and checks a user registry database in block 216 and validates and confirms receiving computer 130 as a member of the trusted customer network. The validation may include checking registry database files for name, phone number, password, user ID, hardware ID, and other unique identifying information of receiving computer 130. For example, sending the electronic request from the initiating computer to the registry server can include sending an identifying image of a receiving party to be checked against a registered image of the receiving party in the registry.

When the unique information (e.g., name and phone number) of receiving computer 130 already exists and is found on the registry server 110, the process continues below in block 230. However, when the unique information (e.g., name and phone number) of receiving computer 130 is not found on the registry server 110, an SMS install message is sent to the phone number of the receiving party 130 in block 220. In block 224, receiving computer 130 receives the SMS install message and clicks on a link in the SMS message to install the trusted customer software application. In block 226, the receiving party installs the trusted customer software application on their computer 130. When the installation process is complete, the receiving computer 130 sends a completion message to the registry server 110 in block 228. The registry computer 130 validates receiving computer 130 as a member of the trusted customer network.

As outlined above, when the registry server 110 validates receiving computer 130 as a member of the trusted customer network, registry server 110 creates, encrypts, and forwards an identity request message to verification authority server 120 in block 230. The request message includes a request for the verification authority 120 to issue a secure token. In block 232, the verification authority 120 decrypts and processes the request and creates a secure token in block 233. The verification authority 120 creates a secure token with a unique identifier that is known only to the verification authority server 120. The secure token may have value associated with it, or it can have no specified value at this point. The verification authority server 120 then registers the secure token in a token registry file in block 234 and encrypts the registered secure token with double key encryption, using the public key of receiving computer 130. The verification authority 120 then issues the encrypted registered secure token to receiving computer 130 in block 236.

In block 238, receiving computer 130 receives the encrypted registered secure token. Receiving computer 130, decrypts and optionally in block 242 launches an approval window, which provides information about the initiating (party) computer 140, secure token value (if any), and presents both an "Accept" button and a "Reject" button to the receiving party. The parties (e.g., receiving computer 130, initiating computer 140, registry server 110, and verification authority server 120) can update the token by adding or appending a breadcrumb to the token. Adding or appending a breadcrumb to the token can be used to create a log of communication activity. One example log entry of communication activity noted by a breadcrumb can be to indicate that the identity verification software application on the receiving computer updated the token with identifying information.

If the secure token is rejected by the receiving party 130, then a rejection message is sent to the verification authority server 120 in block 246, and the transaction is reversed. In block 248, the token is retired. In block 250, registry server 110 is contacted and logs the rejection, and in block 252, the registry server 110 notifies the initiating computer 140 that the receiving computer 130 was unable to be verified and that the encrypted secure token was retired.

If the encrypted registered secure token is accepted by the receiving party 130 in block 243, or if no approval window is required, receiving computer 130 approves the release of his identity verification to initiating computer 140. In block 256, receiving computer 130 requests the initiating computer's public key from the registry server 110. In block 258, the registry server 110 processes the key request and sends the initiating computer's public key to the receiving computer 130. Receiving computer 130 receives the initiating computer's public key from the registry server 110 and then encrypts the updated secure token using double key encryption with the public key of initiating computer 140 in block 260. In block 262, receiving computer 130 sends the encrypted secure token to initiating computer 140.

In block 264, initiating computer 140 receives the encrypted secure token and decrypts it. Initiating computer 140 checks that receiving computer 130 has authorized receiving computer's identity verification. In an example embodiment of the invention, initiating computer 140 adds a transaction ID to be routed with the electronic request to link the electronic request and subsequently generated tokens to an individual communication and/or transaction. In block 266, initiating computer 140 requests the public key of the verification authority server 120 from the registry server 110. In block 268, the initiating computer 140 receives the public key and encrypts the secure token using double key encryption with the public key of the verification authority server 120. In block 270, initiating computer 140 sends the encrypted token to the verification authority server 120.

In block 272, verification authority server 120 receives the encrypted token and processes it by decrypting and reading the unique identifier of the token to check it against the token registry file (from block 234). When the token is verified in block 274 (e.g., the unique identifier is found in the token registry file), the verification authority 120 marks token as having been used and retires the token in block 248, and the process continues below in block 288.

However, if the token is not verified in block 274 (e.g., the unique identifier was not found, or was found to be used previously), then the verification authority server 120 requests the public key of the initiating computer 140 from the registry server 110 in block 278. In block 280, the registry server 110 receives the request and sends the public key of the initiating computer 140 to the verification authority server 120. In block 282, the verification authority server 120 receives the public key of the initiating computer 140 and encrypts it. In block 284, the verification authority sends a message to the initiating computer 140 that the token is not valid, and the initiating computer 140 can contact the receiving computer 130 to address problems with the token.

When the token is verified in block 274, the verification authority server 120 requests the public key of the initiating computer 140 from the registry server 110 in block 288. In block 290, the registry server 110 receives the request and sends the public key of the initiating computer 140 to the verification authority server 120. In block 292, the verification authority server 120 receives the public key of the initiating computer 140 and encrypts it. In block 294, the verification authority sends a message to the initiating computer 140 that the token is valid.

The computer-implemented methods of the invention establish that the secure digital token passed through a known network member having unique access to its network private key, which provides identifying information of the receiving (computer) party without requiring encryption keys, passwords, or identifying information to travel with the token. Only communications that pass through a trusted customer software application having access to the receiving computer's unique identifying information (such as its private key, for example) are approved. The computer-implemented invention provides methods carried out by non-transitory computer-readable instructions running on a processor in a receiving computer on a trusted customer network provide a "key" that unlocks the trusted customer network communications path.

Figure 3:
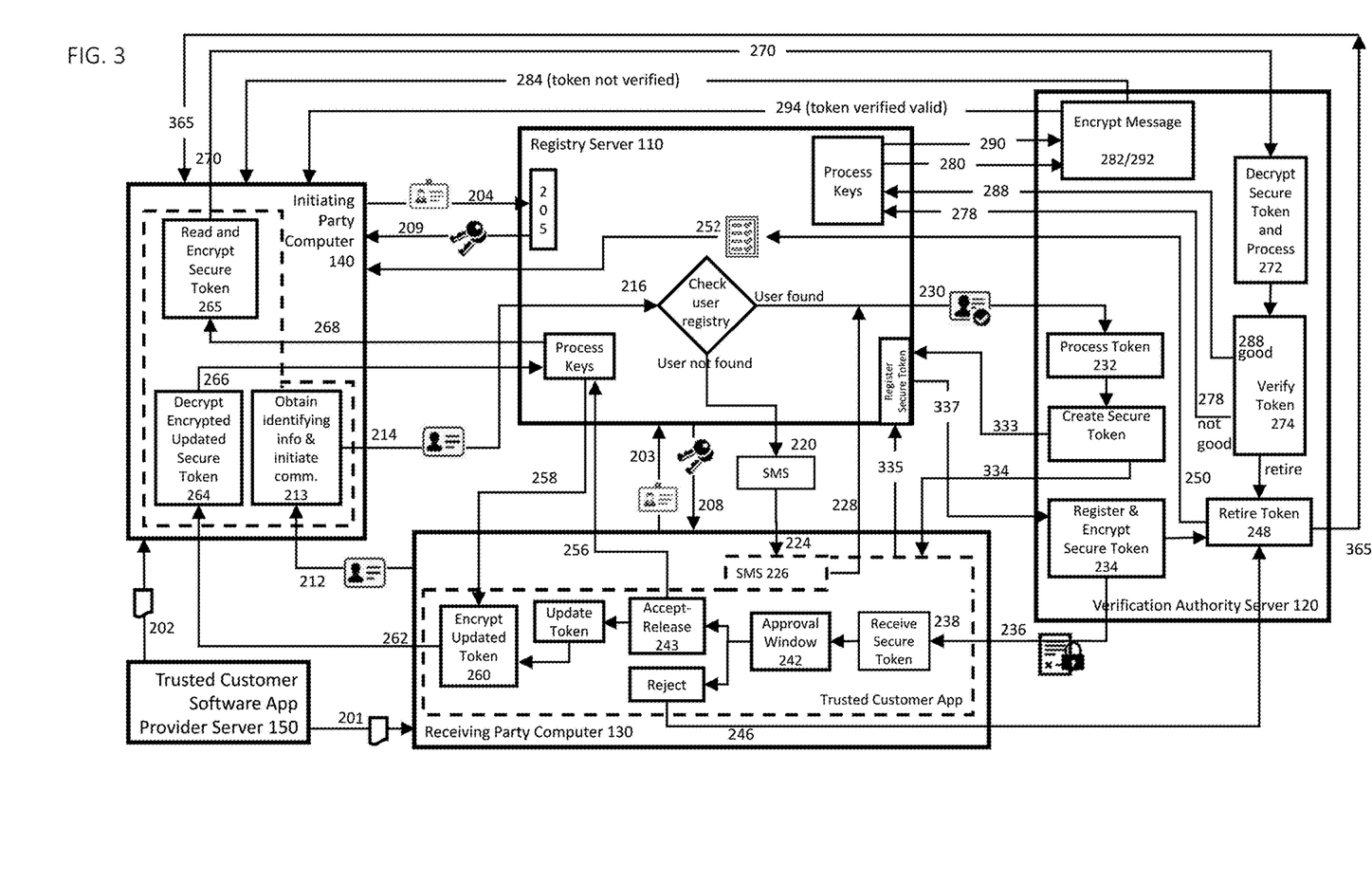
FIG. 3 shows another example embodiment of a system and method for issuing and redeeming a digital token in accordance with the invention using an automated no-touch hardware-identifying process, where the user to-be-vetted does not take any physical action during the process.

In a second example embodiment of the invention shown in FIG. 3, when verification authority server 120 creates the secure token in block 232 and sends a request to the registry server 110 to register the token in block 333. At the same time, the verification authority server 120 sends a request to the trusted customer application on the receiving (party) computer 130 in block 334 to query the computer hardware/operating system of the receiving computer 130 to append the secure token with unique data (e.g., a selfie photo, a UDID for a smart phone, and other data unique to the receiving party and the receiving party computer 130). In block 335, the receiving computer 130 adds this additional information to the token and sends the updated token to the registry server 110. If registry server 110 approves and sends the updated token to verification authority server 120 in block 337, then verification authority server 120 will process the updated token in block 338 and retire the token in block 248 and send token validity status to initiating computer 140 in block 365. If the registry server 110 does not approve the updated token in block 337, the updated token is retired in block 248, and the verification server 120 sends a token validity status message to the initiating party in block 365 indicating that the updated token was not approved. In this second example embodiment of the invention, the hardware-identifying-characteristics act as a more secure authentication device (e.g., password), with the hardware-identifying-characteristics provided by an automated process where the trusted customer app interfaces with the computer operating system of the receiving party 130 in a "no touch" manner, meaning the user to-be-vetted (i.e., the receiving computer 130) does not need to take any physical action during the process.

In some example embodiments of the invention, access to the figurative "key" (i.e., the trusted customer software application running on receiving computer 130) can be controlled by security protocols which require authorizations to use the "key," such as a password used to authenticate the receiving computer 130. Additionally, access to the key may also include a requirement of establishing physical possession of the trusted customer software app on the receiving computer. This could include an additional biometric authentication method such as a retina scan, facial recognition, fingerprint, and other biometric authenticators. The use of the trusted customer application itself can also require authentication, which can include user ID, password, and device information as well. When the trusted customer application is up and running on a mobile phone, the system knows that a mobile phone user was authenticated to the phone (via the biometric, for example), and a trusted customer user was authenticated to the registry server 110.

Security may be enhanced further by using a cellular connection as part of the communication path to the pre-registered receiving party computer 130 with a cellular account with a mobile phone provider. The name (and other identifying characteristics) on the account may be tested against the name of person that the system seeks to verify to see if there is a match. This may further establish the identity and trustworthiness of the receiving party. When a mobile phone user has an account with a mobile phone service provider that has the same name and address used for his trusted customer account, it is unlikely that the receiving computer is not in the possession of that same user. Matching the trusted customer identity information to the mobile phone service provider information provides an additional manner of authentication of possession of the device and authentication to the trusted customer network. For example, when verification authority 120 issues and sends the registered encrypted secure token to the receiving computer 130 in block 236, the system can send this token over a cellular communication path whose account has identifying characteristics that match the characteristics of the receiving computer 130. Further, the cellular connection can be required to be a single-purpose phone number used only for trusted customer verification.

Security may be additionally enhanced by requiring the receiving computer 130 identified by the system to have been purchased in the account name of the person the system seeks to verify the identity of, or other methods of verifying that the person (to which the account is established) has physical (or legal) possession of the hardware.

The trusted customer system and method is unique because it does not provide access to a payment network. Instead, access is granted to a singular Internet communications path containing one and only one registered user entity which possesses exclusive access to the system's pre-registered computer that matches their account.

Example Computer Server

Figure 4:
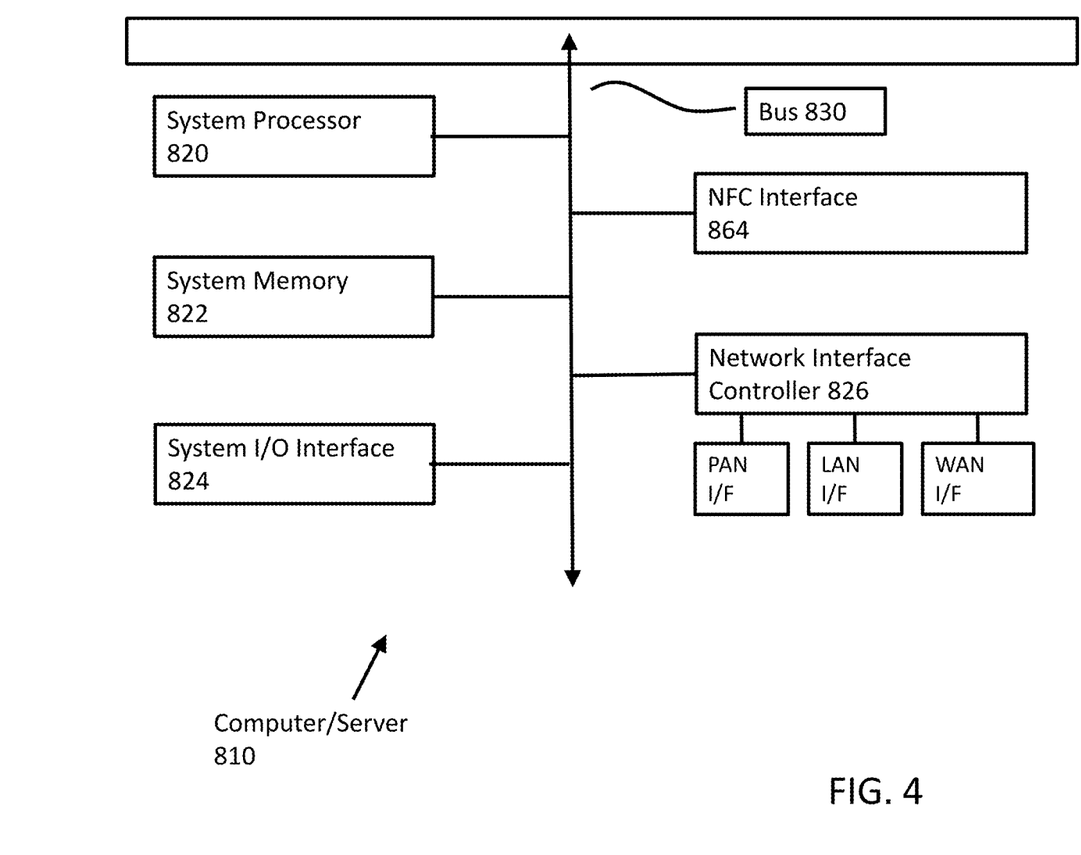
FIG. 4 shows an example electronic transaction computer server in accordance with the claimed invention.

As shown further in FIG. 4, the electronic trusted customer identity verification network computing devices of the invention, including the initiating party computer, receiving party computer, trusted customer software app provider server, registry server, and verification authority server, are shown as an example "server" 810. Computer/server 810 is an example computing device that includes system processor(s) 820, system memory 822, system I/O interface(s) 824, and network interface controller 826, which are coupled together by a bus 830 or other numbers and types of links, although the trusted customer identity verification network computing devices 810 can include other components and elements in other configurations and may include servers and client computers. In this example, the electronic computing device 810 is implemented as a standalone device, although the electronic computing devices 810 could be implemented as blade devices in a chassis-blade implementation, for example.

System processor 820 includes one or more microprocessors configured to execute computer/machine readable and executable instructions stored in system memory 822 to implement the trusted customer identity verification system on a client server network system, such as system 100, for example. When executed by at least one processor, the instructions stored in system memory 822 cause the processor 820 to generate, transfer, verify, and redeem tokens and conduct the electronic exchange. The instructions on the computer readable medium, including system memory 822, further cause the processor 820 to perform steps including identity verification methods for establishing a trusted customer network of users, including a buyer and a seller.

The system processor 820 is configured to execute computer/machine readable and executable instructions stored in system memory 822 to implement one or more portions of the processes described above and further below in connection with FIGS. 1-4, for example, although processor 820 can comprise other types and/or combinations of processors, such as digital signal processors, micro-controllers, switch chips, bus controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated with respect to FIGS. 1-4.

System memory 822 includes computer readable media, namely computer readable or processor readable storage media, which are examples of machine-readable storage media. Computer readable storage/machine-readable storage media can include volatile, nonvolatile, removable, and non-removable media implemented in any method or technology for storage of information, such as computer readable/machine-executable instructions, data structures, program modules, or other data, which can be obtained and/or executed by one or more processors, such as system processor 820, to perform actions, including implementing an operating system for controlling the general operation of computing device 810 to generate, transfer, verify, and redeem tokens and otherwise conduct an electronic exchange in accordance with the processes described above in connection with FIGS. 1-4, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer-executable instructions or other machine-executable instructions, and which can be accessed by a computing or specially programmed device, such as trusted customer identity verification network computing devices 810. When the instructions stored in system memory 822 are run by the system processor 820, the trusted customer identity verification network computing device 810 implements at least a portion of the processes described further below to conduct the exchange of valuable assets in connection with FIGS. 1-4, in addition to the various client-server management related functions, including redundancy functions, version controls, server load balancing functions, device configuration functions (e.g., defining network security policies), VPN hosting, network traffic management, loss control, and other functions.

System I/O interface(s) 824 includes one or more user input and output device interface mechanisms, such as a computer keyboard, mouse, display device, and the corresponding physical ports and underlying supporting hardware and software to enable the trusted customer identity verification network computing devices 810 to communicate with the outside environment for accepting user data input and to provide user output, although other types and numbers of user input and output devices can be used. Alternatively, or in addition, as will be described in connection with network interface controller 826 below, the trusted customer identity verification network computing devices 810 can communicate with the outside environment for certain types of operations (e.g., configuration) via a network management port, for example.

Network interface controller 826 provides physical access to a networking medium and provides a low-level addressing system, which enables the trusted customer identity verification network computing devices 810 to engage in TCP/IP communications over network system 555 (shown in FIG. 1) and purchase tokens, issue tokens, validate tokens, redeem tokens, and otherwise conduct an electronic value (currency) exchanges between buyers and sellers (instantiated on computer devices) and to maintain application services although the network interface controller 826 can be constructed for use with other communication protocols and types of networks, and can include other components, and can perform other functions. Network interface controller 826 is sometimes referred to as a transceiver, transceiving device, or network interface card (NIC), which transmits and receives network data packets to one or more networks, such as system 555 in this example. When the trusted customer identity verification network computing device 810 includes more than one system processor 820 (or a processor 820 has more than one core), each processor 820 (and/or core) can use the same single network interface controller 826 or a plurality of network interface controllers 826. Further, the network interface controller 826 can include one or more physical ports, such as Ethernet ports, to couple the trusted customer identity verification network computing devices 810 with other network devices, such as servers and other sites. Additionally, the network interface controller 826 can include certain physical ports dedicated to receiving and/or transmitting certain types of network data, such as device management related data for configuring the trusted customer identity verification network computing devices 810.

The receiving computer, the initiating computer, the registry server, and the verification authority server can communicate using a number of communication protocols. Some example communication protocols include Secure Sockets Layer (SSL), Data Distribution Service (DDS), Transport Layer Security (TLS), near field communication (NFC), and Bluetooth transmission protocols.

In one example, the network interface controller 826 is an FPGA that can include a local memory and be configured with logic to implement one or more aspects of the technology, including by way of example only, purchasing tokens, issuing tokens, validating tokens, redeeming tokens, and otherwise conducting an electronic exchange, although the network interface controller 826 can include other types of configurable hardware, such as digital signal processors, micro-controllers, ASICs, PLDs, FPLDs, and the like, programmed or configured according to the teachings as described and illustrated herein with respect to FIGS. 1-4, as well as software executed by the system processor 820, combinations thereof, and other components and elements configured in other manners which could implement one or more aspects of the technology. The use of specialized hardware in this example allows the network interface controller 826 to rapidly process network data packets.

Some example embodiments of the computing device 810 can also include a near field communication (NFC) interface 864. The NFC interface 864 can allow for extremely close-range communication at relatively low data rates (e.g., 424 kb/s), and can comply with such standards as ISO/IEC 18092, ECMA-340, ISO/IEC 21481, ECMA-352, ISO 14443, and/or ISO 15693. The NFC interface 864 can have a range of approximately 2-4 cm. The close-range communication with the NFC interface 864 can take place via magnetic field induction, allowing the NFC interface 864 to communicate with other NFC interfaces 864 or to retrieve information from tags having radio frequency identification (RFID) circuitry and with other NFC-equipped computing devices 810. The NFC interface 864 can enable initiation and/or facilitation of data transfer of documents, and other data from one computing device 810 to another computing device 810, including tokens and payments to and from buyers 100 and sellers in the system 555 as shown in FIG. 1.

Bus 830 includes at least one internal device component communication bus, link, bridge and supporting components, such as bus controllers and/or arbiters. These devices enable the various components of the trusted customer identity verification network computing device 810, such as the system processor 820, system memory 822, system I/O interface 824, and network interface controller 826, to communicate, although the bus 830 can enable one or more components of the trusted customer identity verification network computing device 810 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses can be used, and the particular types and arrangement of buses will depend on the particular configuration of trusted customer identity verification network computing device 810.

While each of the computers can include the processor 820, memory 822, network interface controller 826, and I/O interface 824 coupled together by a bus 830, two or more computing systems or devices can be substituted for any one of the devices in the system 555. Accordingly, principles and advantages of distributed processing, such as redundancy, replication, and the like, also can be implemented as desired to increase the robustness and performance of the devices and systems of the system 555. The system 555 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, Wi-Fi, local area networks, intranets, and combinations of networks, for example. Peer-to-peer (p2p) networks can be used.

As outlined above, each of the client computers, sites, and servers can include a central processing unit (CPU), controller or processor, a memory, and an interface which are coupled together by a bus or other link, although other numbers and types of each of the components and other configurations and locations for the components can be used. The processors in the computing devices can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, such as a CRT or LCD screen by way of example only, although other types and numbers of displays could be used.

Although an example of the trusted customer identity verification network computing devices 810 are described and illustrated in connection with FIG. 4, each of the computers and computing devices of the system 555 could be implemented on any suitable computer system or computing device. It is to be understood that the example devices and systems of the system 555 are for exemplary purposes, as many variations of the specific hardware and software used to implement the system 555 are possible, as will be appreciated by those skilled in the relevant art(s).

Further, each of the devices of the system 555 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

The operation of example processes to provide a system and method of purchasing tokens, issuing tokens, validating tokens, redeeming tokens, and otherwise conducting an electronic value exchange shown in FIGS. 1-4 can be run on the trusted customer identity verification network system 100. The flow diagrams of FIGS. 1-4 are representative of example machine readable instructions for implementing the process of conducting the electronic exchange. The steps described above are example machine readable instructions for implementing a method in accordance with the examples described in this disclosure. In one example, the machine-readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the trusted customer identity verification network system could be implemented by software, hardware, and/or firmware. Also, some or all of the machine-readable instructions described herein can be implemented manually. Further, although an example of the present invention is described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

By performing a method of trusted customer identity verification using a system described above, if a buyer wishes to exchange an item of value for another item of value, an anonymous and secured exchange is accomplished.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as can be specified in the claims. Accordingly, the invention is limited only by the following claims and equivalents thereto.

We claim:

1. An identity verification method for linking a receiving computer, a secure token, and an initiating computer for establishing a trusted customer network of users to conduct a transaction, the method comprising:
   a. registering the receiving computer, wherein the registering comprises:
      1) downloading, by the receiving computer, an identity verification software application;
      2) creating, by the receiving computer, an encryption key pair, the key pair including a receiving computer public key and a receiving computer private key;
      3) storing, by the receiving computer, the receiving computer private key;
      4) sending, from the receiving computer to a registry server, an authentication message over a communications network, the authentication message including unique receiving computer identifying information and the receiving computer public key to register the receiving computer in a registry database of the registry server;
   b. vetting, by the initiating computer, the receiving computer, wherein the vetting comprises:
      1) sending an electronic request from the receiving computer to an initiating computer to vet the receiving computer for inclusion in the trusted customer network of users, wherein the electronic request includes unique receiving computer identifying information;
      2) sending the electronic request from the initiating computer to the registry server;
      3) checking a member registry to confirm that the receiving computer and the initiating computer are members of the trusted customer network of users;
   c. providing, by a verification authority server, a secure token to the receiving computer, wherein the providing comprises:
      1) creating a secure token;
      2) registering the secure token in a token registry database; and
      3) encrypting the registered secure token with the receiving computer public key;
      4) issuing the encrypted registered secure token to the receiving computer;
   d. updating and sending the secure token from the receiving computer to the initiating computer, wherein the updating and sending comprises:
      1) decrypting the encrypted registered secure token using the receiving computer private key;
      2) updating the registered secure token with approval information acknowledging that the receiving computer wishes to proceed with an exchange;
      3) receiving initiating computer public key from the registry server;
      4) encrypting the updated registered secure token with the initiating computer public key; and
      5) forwarding the encrypted updated registered token to the initiating computer for verification,
   e. verifying and sending the updated secure token from the initiating computer, wherein the verifying and sending comprises:
      1) decrypting the encrypted updated registered secure token with the initiating computer private key;
      2) reading the decrypted secure token to confirm the unique receiving computer identifying information to verify that receiving computer is the same party that previously sent the electronic request;
      3) encrypting, with the initiating computer, the secure token; and
      4) forwarding the encrypted secure token for verification;
   f. verifying, by the verification authority server, that the token is valid, wherein the verifying comprises:
      1) decrypting the forwarded secure token;
      2) checking token ID information of the secure token against the token registry to link the electronic request to the receiving computer; and
      3) when the token ID information matches the token registry, retiring the token and sending an encrypted message to the initiating computer indicating token acceptance and approval of the transaction.

2. A no-touch password verification method for establishing a trusted customer network of users to conduct a transaction, the method comprising:
   executing, using one or more processors, computer executable instructions embodied in at least one non-transitory computer readable storage medium coupled to the one or more processors to:
   a. send, by a receiving computer comprising the one or more processors, an authentication message including account information and unique receiving computer identifying information to a registry server over a communications network;
   b. open and maintain an uninterrupted communication path between the receiving computer and an initiating computer;
   c. process a request by:
      i. sending, by the receiving computer, an electronic request to the initiating computer to vet the receiving computer for inclusion in the trusted customer network of users, wherein the electronic request includes unique receiving computer identifying information;
      ii. sending the electronic request from the initiating computer to the registry server;
      iii. checking, on the registry server, a member registry to confirm that the receiving computer and the initiating computer are members of the trusted customer network of users;
      iv. providing, by a verification authority server, a secure token to the receiving computer, including:
         A. creating the secure token and encrypting it with the receiving computer's public key;
         B. registering the secure token in a token registry database; and
         C. forwarding the registered secure token to the receiving computer;
   d. decrypt the secure token with the receiving computer's private key;
   e. update, on the receiving computer, the token with a symmetrical password and unique receiving computer identifying information acknowledging that the receiving computer wishes to proceed with an exchange;
   f. forward, using the receiving computer, the updated token to the registry server for authorization, the authorization including:
      i. reading the symmetrical password and unique receiving computer identifying information to confirm authorization of the receiving computer to proceed; and
      ii. checking, using the registry server, token ID information against the token registry, wherein when the token ID information matches the token registry, the registry server retires the token, and sends a message to the initiating computer indicating token acceptance and approval of the transaction.

3. A method of claim 1, wherein vetting the receiving computer includes confirming a unique identifying characteristic of the receiving computer, wherein the unique identifying characteristic of the receiving computer includes a unique device identifier (UDID).

4. A method of claim 1, wherein updating the token with approval information acknowledging that the receiving computer wishes to proceed with an exchange includes:
launching and displaying an approval window with the receiving computer, the approval window including initiating computer information and a secure token value; and
generating and displaying an accept option to a user of the receiving computer to continue a transaction.

5. A method of claim 1, wherein the receiving computer sends and receives to and from at least one of the group of the initiating computer, and the registry server using a pre-registered mobile number on a cellular network.

6. A method of claim 1, wherein at least one of the group of the receiving computer, the initiating computer, and the registry server adds a breadcrumb of information to communications to create a log of communication activity indicating that the identity verification software application on the receiving computer updated the token with additional identifying information.

7. A method of claim 1, wherein sending the electronic request from the initiating computer to the registry server includes forwarding a verification request to a surrogate initiator computer who then takes the place of the initiating computer and completes the identity verification method on behalf of the initiating computer.

8. A method of claim 1, wherein sending the authentication message includes at least one of the group of a password, a user ID, a hardware ID, and a biometric identifying characteristic.

9. A method of claim 1, wherein verification and token acceptance is used to approve at least one of the group of a payment transaction and an email transmission.

10. A method of claim 1, wherein sending or receiving the digital token by at least one of the group of the receiving computer, the initiating computer, and the registry server is performed using at least one of the group of the Internet, Wi-Fi, a local area network, and a peer-to-peer (p2p) network.

11. A method of claim 1, wherein sending the electronic request from the initiating computer to the registry server includes:
adding a transaction ID to be routed with the electronic request; and
linking the electronic request and subsequently generated tokens to an individual communication.

12. A method of claim 1, wherein sending the electronic request from the initiating computer to the registry server includes:
setting a timer when the electronic request is sent; and
rejecting a verification when the electronic request is not received by the registry server within a predetermined time.

13. A method of claim 1, wherein creating a secure token includes creating a secure token with a monetary value.

14. A method of claim 1, wherein sending the electronic request from the initiating computer to the registry server includes sending an identifying image of a receiving party to be checked against a registered image of the receiving party in the registry.

15. A method of claim 1, wherein the receiving computer is a smart phone in the physical possession of a receiving party.

16. A method of claim 1, wherein the identity verification software application on the receiving computer interfaces with an operating system on the receiving computer to request identifying data characteristics of at least one of the group of the operating system and a Unique Device Identifier (UDID).

17. A method of claim 1 further comprising:
checking the member registry to confirm that the verification authority server is a member of the trusted customer network of users, and
wherein checking the member registry to confirm that the receiving computer and the initiating computer are members of the trusted customer network of users includes identifying at least one of the group of the receiving computer and the initiating computer with at least one of a digital signature and a hard coding of the registry server's Uniform Resource Locator (URL), to confirm network membership.

18. A method of claim 1, wherein a communication path to and from the receiving computer is a cellular communication network through an account in a name of a receiving party seeking identity verification, and wherein the cellular communication is accessed by a connection established with a single-purpose phone number used only for trusted customer identity verification.

19. A method of claim 1, further comprising:
receiving evidence of physical possession of the receiving party computer from a receiving party seeking identity verification.

20. A method of claim 19, wherein the evidence of physical possession of the receiving party computer includes evidence of the purchase of the receiving computer in an account name of the receiving party.

21. An identity verification system for establishing a trusted customer network of users to conduct a transaction, the system comprising:
a receiving computer;
an initiating computer;
a registry server;
a registry database associated with the registry server;
a verification authority; and
a communication network,
wherein the system is configured to:
a. register, by a receiving party, the receiving computer in the registry database, wherein the registering of the receiving computer comprises:
1) downloading an identity verification software application on the receiving computer;
2) creating an encryption key pair with the receiving computer and the initiating computer, the key pair including a receiving computer public key and a receiving computer private key;
3) storing the receiving computer private key on the receiving computer;
4) sending an authentication message from the receiving computer to the registry server over the communications network; and
5) registering the receiving computer in the registry database associated with the registry server;
b. vet, by the initiating computer, the receiving computer, wherein vetting of the receiving computer comprises:

1) sending an electronic request from the receiving computer to the initiating computer over a unique network communication path of the communication network between the receiving computer and the initiating computer—an uninterrupted path being established by opening a communications port on the receiving computer and the initiating computer and keeping this port open and routing all communications through this port throughout the process to vet the receiving computer for inclusion in the trusted customer network of users;
2) maintaining the uninterrupted communication path between the receiving computer and the initiating computer throughout the identity verification by requiring all communications to travel through this port until a response is received from the receiving computer;
3) sending the electronic request from the initiating computer to the registry server; and
4) checking a member registry to confirm that the receiving computer and the initiating computer are members of the trusted customer network of users;

c. provide a secure token to the receiving computer, wherein providing comprises:
1) creating, by the verification authority, a secure token;
2) registering, by the verification authority, the secure token in a token registry database; and
3) encrypting, by the verification authority, the registered secure token with the receiving computer public key; and
4) issuing, by the verification authority, the encrypted registered secure token to the receiving computer;

d. update and send the secure token from the receiving computer to the initiating computer using the same uninterrupted communication path established between the initiating computer and the receiving computer, wherein updating and sending comprises:
1) decrypting the encrypted registered secure token using the receiving computer private key;
2) updating the registered secure token with approval information acknowledging that the receiving computer wishes to proceed with an exchange;
3) receiving the initiating computer public key from the registry server;
4) encrypting the updated registered secure token with the initiating computer public key; and
5) forwarding the encrypted updated registered token to the initiating computer for verification via the uninterrupted communication path established between the receiving computer and the initiating computer, e. verify and send the updated secure token from the initiating computer, wherein verifying and sending comprises:
1) decrypting the encrypted updated registered secure token with the initiating computer private key;
2) reading the decrypted secure token to confirm the unique network communication path between the receiving computer and the initiating computer was maintained throughout the identity verification to verify that receiving computer is the same party that previously sent the electronic request;
3) encrypting, with the initiating computer, the secure token; and
4) forwarding the encrypted secure token for verification f. verify the token is valid, wherein verifying comprises:
1) decrypting, by the verification authority, the forwarded secure token;
2) checking, by the verification authority, token ID information of the secure token against the token registry to link the electronic request to the receiving computer, and
3) when the token ID information matches the token registry, retiring, by the verification authority, the token, and sending an encrypted message to the initiating computer indicating token acceptance and approval of the transaction.

* * * * *